(12) United States Patent
Hook et al.

(10) Patent No.: US 10,944,974 B2
(45) Date of Patent: Mar. 9, 2021

(54) METHOD FOR ENCODING AND PROCESSING RAW UHD VIDEO VIA AN EXISTING HD VIDEO ARCHITECTURE

(71) Applicant: Raytheon Company, Waltham, MA (US)

(72) Inventors: Tyler Layne Hook, Little Elm, TX (US); Carl A. Woody, McKinney, TX (US); Christopher J. Beardsley, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/403,781

(22) Filed: Jan. 11, 2017

(65) Prior Publication Data

US 2018/0199047 A1    Jul. 12, 2018

(51) Int. Cl.
| | | |
|---|---|---|
| H04N 5/268 | (2006.01) | |
| H04N 19/30 | (2014.01) | |
| H04N 7/01 | (2006.01) | |
| H04N 19/46 | (2014.01) | |

(52) U.S. Cl.
CPC ............ *H04N 19/30* (2014.11); *H04N 5/268* (2013.01); *H04N 7/01* (2013.01); *H04N 19/46* (2014.11)

(58) Field of Classification Search
CPC .......... H04N 19/30; H04N 19/46; H04N 7/01; H04N 5/268
USPC ..................................... 375/240.02
See application file for complete search history.

(56) References Cited

U.S. PATENT DOCUMENTS

| | | | |
|---|---|---|---|
| 5,115,309 | A | 5/1992 | Hang |
| 5,566,208 | A | 10/1996 | Balakrishnan |
| 6,005,621 | A | 12/1999 | Linzer et al. |
| 8,149,243 | B1 | 4/2012 | Kilgard |
| 8,427,579 | B2 | 4/2013 | Yi et al. |
| 8,949,913 | B1 | 2/2015 | Thakkar et al. |
| 9,113,020 | B2 | 8/2015 | Suh et al. |
| 9,124,861 | B2 | 9/2015 | Lam et al. |
| 9,497,457 | B1 | 11/2016 | Gupta |

(Continued)

FOREIGN PATENT DOCUMENTS

| | | |
|---|---|---|
| CA | 2368890 A1 | 10/2000 |
| EP | 2053847 A1 | 4/2009 |

(Continued)

OTHER PUBLICATIONS

SMPTE ST 425-5:2015 "Image Format and Ancillary Data Mapping for the Quad Link 3 Gb/s Serial Interface," Mar. 6, 2015.*

(Continued)

*Primary Examiner* — Ayman A Abaza
(74) *Attorney, Agent, or Firm* — Burns & Levinson, LLP; Joseph M. Maraia

(57) ABSTRACT

A sensor data processing system and method performs segmentation and packing of image data from one or more ultra-high definition (UHD) image sensor for transport and processing by conventional high definition image data processing systems and pathways. The UHD image frames are segmented into a number of smaller frames and directed in parallel over the conventional HD pathways. Metadata is generated and directed along with the smaller frames. The metadata includes sufficient information for lossless reconstruction of the UHD image frames from the smaller frames.

19 Claims, 5 Drawing Sheets

(56) References Cited

U.S. PATENT DOCUMENTS

| | | | |
|---|---|---|---|
| 2002/0061064 | A1 | 5/2002 | Ishikawa et al. |
| 2004/0226050 | A1 | 11/2004 | Matsuzaki et al. |
| 2007/0024706 | A1 | 2/2007 | Brannon et al. |
| 2007/0164894 | A1 | 7/2007 | Sherman et al. |
| 2008/0036864 | A1 | 2/2008 | McCubbrey et al. |
| 2008/0174697 | A1 | 7/2008 | Kim |
| 2008/0291996 | A1 | 11/2008 | Pateux et al. |
| 2011/0243532 | A1 | 10/2011 | Bostaph et al. |
| 2011/0292287 | A1 | 12/2011 | Washington |
| 2013/0128041 | A1 | 5/2013 | Hershey et al. |
| 2013/0174209 | A1 | 7/2013 | Jung et al. |
| 2013/0287104 | A1 | 10/2013 | Jeong et al. |
| 2014/0078165 | A1* | 3/2014 | Messmer ............... H04N 1/603 345/589 |
| 2014/0095578 | A1 | 4/2014 | Rajendran et al. |
| 2014/0133568 | A1 | 5/2014 | Otsuka |
| 2015/0015782 | A1 | 1/2015 | Yeh et al. |
| 2015/0016504 | A1 | 1/2015 | Auyeung |
| 2015/0042845 | A1 | 2/2015 | Zhao |
| 2015/0082343 | A1* | 3/2015 | Goldfeder ........ H04N 21/23424 725/32 |
| 2015/0101002 | A1* | 4/2015 | Yamashita ....... H04N 21/23602 725/116 |
| 2015/0156557 | A1 | 6/2015 | Kang et al. |
| 2015/0229878 | A1 | 8/2015 | Hwang et al. |
| 2015/0373330 | A1 | 12/2015 | Jeong et al. |

FOREIGN PATENT DOCUMENTS

| | | | |
|---|---|---|---|
| EP | 3038373 | A1 | 6/2016 |
| KR | 20150065069 | A | 6/2015 |
| WO | 2015025741 | A1 | 2/2015 |
| WO | 2016/129891 | A1 | 8/2016 |
| WO | 2016129891 | A1 | 8/2016 |

OTHER PUBLICATIONS

Advice on the use of 3 Gbit/s HD-SDI interfaces, Technical Report 002, EBU Technology and development, Geneva, Jul. 2011.*

SMPTE ST 425-5:2015 "Image Format and Ancillary Data Mapping for the Quad Link 3 Gb/s Serial Interface," Mar. 6, 2015 (Year: 2015).*

International Search Report and Written Opinion from related PCT Application No. PCT/US2018/016436 dated Mar. 14, 2018.

International Search Report and Written Opinion from related PCT Application No. PCT/US2017/051308 dated Nov. 8, 2017.

Jiri Halak et al., "Real-time long-distance transfer of uncompressed 4K video for remote collaboration," Future Generation Computer Systems, vol. 27, No. 7, Jul. 1, 2011, pp. 886-892.

SMPTE ST 425-5:2015 "Image Format and Ancillary Data Mapping for the Quad Link 3 Gb/s Serial Interface," Mar. 26, 2015, XP055420124 (28 pages).

SMPTE 3Gb/s SDI for Transport of 1080p50/60, 3D, UHDTV1 / 4k and Beyond, Dec. 31, 2013, XP055371753 (23 pages).

International Search Report and Written Opinion from related PCT Application No. PCT/US2018/016432 dated May 18, 2018.

Notice of Preliminary Rejection from related KR Application No. 10-2019-7017999, dated Sep. 22, 2020. (Partial translation attached).

Notice of Preliminary Rejection from related Korean Application No. 10-2019-7028918, dated Jul. 29, 2020.

Notice of Preliminary Rejection from related Korean Application No. 10-2019-7017999, dated Sep. 22, 2020.

SMPTE ST 425-5:2015, "SMPTE Standard Image Format and Ancillary Data Mapping for the Quad Link 3 Gb/s Serial Interface", Revision of SMPTE ST 425-5:2014, p. 1-28 (Jun. 21, 2015).

Notice of Preliminary Rejection from related Korean Application No. 10-2019-7028914 dated Oct. 2, 2020.

International Preliminary Report on Patentability from related PCT Application No. PCT/US17/051308 dated Jul. 16, 2019.

International Preliminary Report on Patentability from related PCT Application No. PCT/US18/016432 dated Sep. 10, 2019.

International Preliminary Report on Patentability from related PCT Application No. PCT/US18/016436 dated Sep. 10, 2019.

Office Action from related Israeli Application No. 266771, dated Dec. 20, 2020.

Office Action from related Chinese Application No. 201780081976.8, dated Dec. 17, 2020.

* cited by examiner

METHOD FOR ENCODING AND PROCESSING RAW UHD VIDEO VIA AN EXISTING HD VIDEO ARCHITECTURE

FIELD OF TECHNOLOGY

The present disclosure is in the field of image processing architectures and more particularly in the field of Ultra-high Definition video processing.

BACKGROUND

Ultra High Definition (UHD) image sensors, which have a large image format and small pixel pitch, are becoming commonly available for use in numerous new products and applications. However conventional video architectures generally do not support bandwidth and timing requirements of UHD sensors. New video architectures that support the bandwidth and timing requirements of UHD sensors have been developed; however, these new video architectures are generally developed from scratch for particular uses without taking advantage of previously available hardware.

Existing high definition (HD) video architectures are generally configured for processing streams of video data that conform to one or more standard formats such as the Society of Motion Picture and Television Engineers (SMPTE) standards SMPTE 292M and SMPTE 424M, for example. These standards include a 720p high definition (HDTV) format, in which video data is formatted in frames having 720 horizontal lines and an aspect ratio of 16:9. The SMPTE 292M standard includes a 720p format which has a resolution of 1280×720 pixels, for example.

A common transmission format for HD video data is 720p60, in which the video data in 720p format is transmitted at 60 frames per second. The SMPTE 424M standard includes a 1080p60 transmission format in which data in 1080p format is transmitted at 60 frames per second. The video data in 1080p format is sometimes referred to as "full HD" and has a resolution of 1920×1080 pixels.

A large number of currently deployed image detection systems are built in conformance with HD video standards, such as the commonly used 720p standard. The 1280×720 pixel frames of a 720p standard system about 1.5 megapixels per frame. In contrast, UHD image sensors generally output image frames in 5 k×5 k format, which have about 25 million pixels per frame. Therefore, the 1280×720 pixels used in a 720p standard system are not nearly enough to transport the much larger number of pixels generated by an UHD image sensor.

Various techniques have been used to process image data from UHD image sensors in conjunction with existing HD video architectures. For example, for compatibility with the HD video architectures, the UHD video data is commonly compressed, either spatially or temporally, using various compression algorithms that are selected to allow presenting the data as video displays and images that are perceptible by human viewers. These compression algorithms lose or discard some of the image data output from the image sensors that may not be necessary for generation of video displays and images.

In some image processing applications, it is desirable to extract, analyze and/or store raw image sensor data that may not be perceptible by human viewers. This additional information in the raw image sensor data may be extracted and processed by computers and processing circuitry, for example. Compression algorithms that lose or discard some of the image data output from the image sensors are unsuitable for these applications.

Other conventional techniques for processing data from UHD sensors generally involve the use of new or proprietary video architectures that have been developed for particular applications of the UHD sensors. These techniques are costly and inefficient because they do not take advantage of widely available HD video architectures that have been deployed throughout the world.

SUMMARY

Aspects of the present disclosure include a UHD sensor data processing apparatus and method for efficient and lossless collection and of UHD data. A sensor data processing apparatus according to an aspect of the present disclosure includes a raw UHD data input path coupled to processing circuitry and a plurality of image data output paths coupled in parallel to the processing circuitry. One or more metadata output paths are coupled to the processing circuitry in parallel with the image data output paths.

According to an aspect of the present disclosure, the processing circuitry is configured to receive the raw UHD data from a UHD sensor, divide the raw UHD data into lossless segments and direct the lossless segments in parallel onto the image data output paths. The processor circuitry is also configured to generate metadata including encoded information that facilitates reconstruction of the raw UHD data from the lossless segments; and direct the metadata onto the metadata output paths.

According to another aspect of the present disclosure, the processing circuitry is configured to pack the lossless segments into a number of HD image data frames and direct the HD image data frames in parallel onto the image data output paths. The processing circuitry includes a video architecture turret coupled to an SMPTE video processor. The video architecture turret is configured to receive a number of raw UHD data streams and spread the raw UHD data streams across eight parallel channels in a 720p60 video format. The processing circuitry is also configured to receive the spread raw UHD data from the video architecture turret on the eight parallel channels in the 720p60 video format, generate the metadata, output the metadata and the spread raw UHD data in a 1080p60 video format via the one or more metadata output paths.

According to another aspect of the present disclosure, video processing circuitry is coupled to the image data output paths and coupled to the metadata output paths. The video processing circuitry is configured to unpack and buffer the raw UHD data received on the image data output paths based on the metadata received on the metadata output paths.

Another aspect of the present disclosure includes a UHD sensor data processing method. The method includes steps of receiving raw UHD data from a UHD sensor, dividing the raw UHD data into lossless segments and directing the lossless segments in parallel onto a plurality of image data output paths. The method also includes generating metadata including encoded information that facilitates reconstruction of the raw UHD data from the lossless segments and directing the metadata onto one or more metadata output paths in parallel with the image data output paths.

According to an aspect of the present disclosure, the method also includes packing the lossless segments into a plurality of HD image data frames, and directing the HD image data frames in parallel onto the image data output paths. According to another aspect of the present disclosure, the method includes spreading the raw UHD data streams across eight parallel channels in a 720p60 video format, receiving the spread raw UHD data from a video architecture turret on the eight parallel channels in the 720p60 video format, and outputting the metadata and the spread raw UHD data in a 1080p60 video format via the one or more metadata output paths.

According to another aspect of the present disclosure, the method includes unpacking and buffering the raw UHD data from the image data output paths based on the metadata, and reassembling the lossless segments from the image data output paths based on the metadata to reconstruct the raw UHD data.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Aspects of the present disclosure include a system and method for lossless communication and processing of UHD video data from one or more image sensors using existing HD video architectures. Processing of UHD video data using currently available video architectures, according to aspects of the present disclosure involves breaking up UHD video data from one or more UHD sensors into manageable segments. The segments are combined and spread into multiple channels of HD video. In an illustrative embodiment, the UHD video data may be provided from a UHD sensor in 5K×5K frames @ 30 Hz, which are broken down into 720p60 segments. In the illustrative embodiment, the segments are combined into multiple channels of SMPTE424M 1080p60 video.

Some commonly used UHD image sensors generate image frames having 5120×5120 pixels per frame. However, according to aspects of the present disclosure, "UHD sensor" can refer to a number of different types of image sensors generating different frame sizes and pixel sizes. For example, some UHD image sensors generate image frames having 4K×4K pixels, and may have 12 bits per pixel, or 10 bits per pixel. The term "UHD sensor" as used herein is not limited to a particular type of sensor or a particular frame size or pixel size.

According to another aspect of the present disclosure, the multiple SMPTE feeds are reconstructed into a single UHD video feed based on metadata that describes how the segments were generated from the UHD sensor data.

An illustrative embodiment of the disclosed UHD video processing system and method uses multiple 720p video frame buffers to break apart and encode large format video from one or more UHD image sensors. Image data from the UHD image sensors is spread across a multi-channel 720p HD video architecture. A robust encoding scheme generates metadata that describes how the portions of raw image data are distributed over the multiple channels and enables lossless reconstruction of the original UHD video data.

Figure 1:
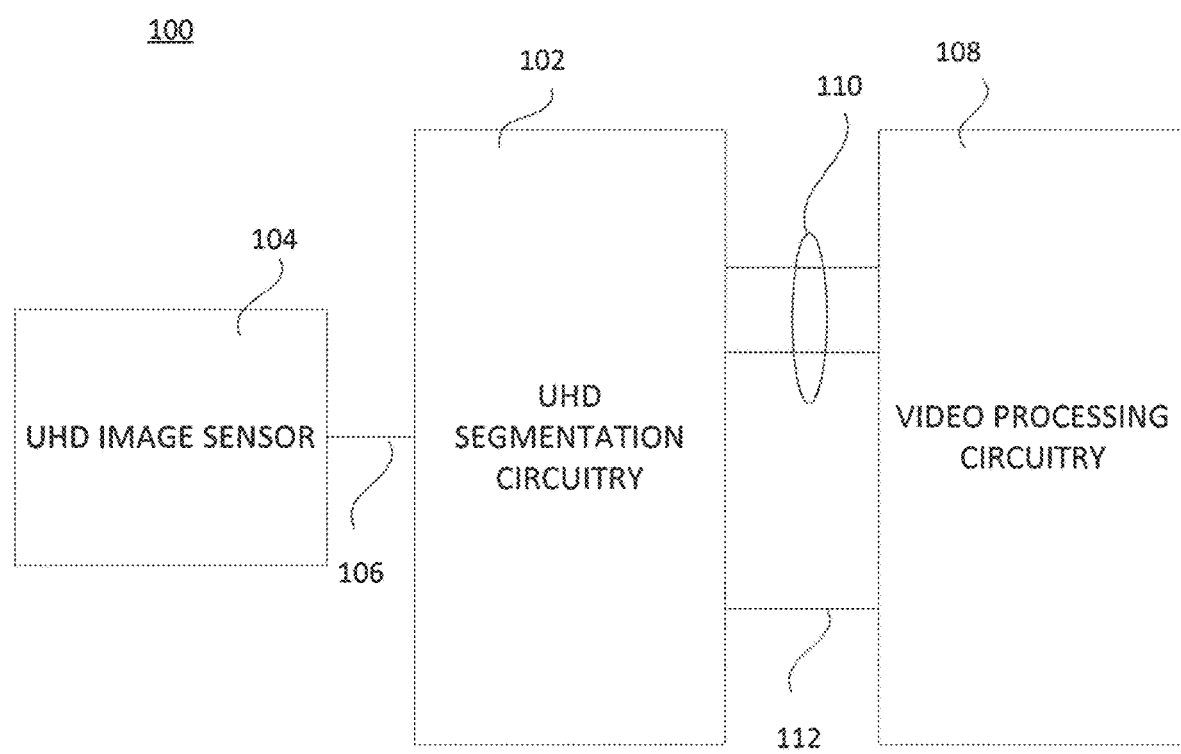
FIG. 1 is a diagram of a UHD sensor data processing system according to an aspect of the present disclosure.

An illustrative embodiment of a UHD sensor data processing system according to an aspect of the present disclosure is described with reference to FIG. 1. The system 100 includes UHD segmentation circuitry 102 coupled to a UHD image sensor 104 via a raw UHD data input path 106. In the illustrative embodiment, the system 100 also includes video processing circuitry 108 coupled to the UHD segmentation circuitry 102 via a number of image data output paths 110 and one or more metadata paths 112. The data output paths 110 and the metadata paths may coexist on the same conductive pathway or may be alternatively be configured on separate conductive pathways.

In the illustrative embodiment the UHD segmentation circuitry 102 includes memory circuitry coupled to processor circuitry. The processor circuitry is configured to receive raw UHD data from a UHD sensor, divide the raw UHD data into lossless segments and direct the lossless segments in parallel onto the image data output paths. In the illustrative embodiment, the processor circuitry is also configured to generate metadata including encoded information that facilitates reconstruction of the raw data from the lossless segments, and to direct the metadata onto the metadata output paths.

Figure 2:
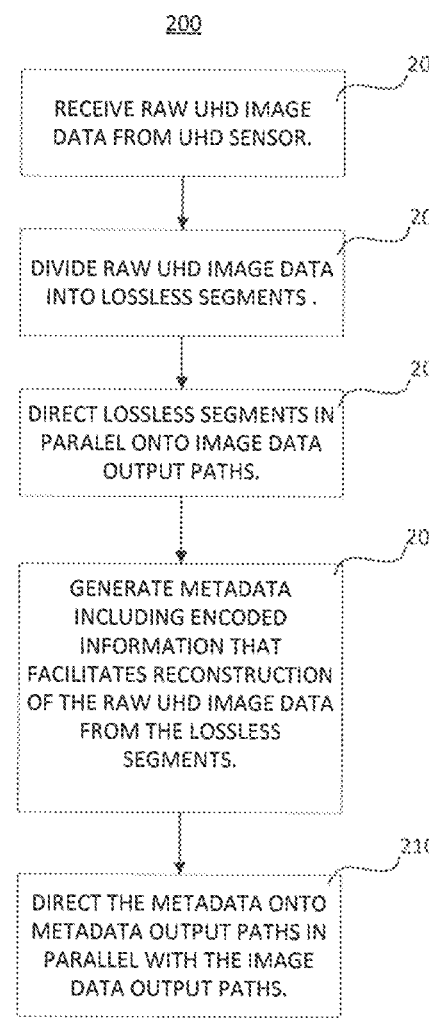
FIG. 2 is a process flow diagram showing a method for processing UHD sensor data according to an aspect of the present disclosure.

A method for processing UHD sensor data according to an aspect of the present disclosure is described with reference to FIG. 2. The method 200 includes receiving raw UHD image data from a UHD sensor, such as an UHD sensor 104 of FIG. 1, at block 202 and dividing the raw UHD data into lossless segments at block 204. In an illustrative embodiment this is performed by UHD segmentation circuitry (e.g., 102, FIG. 1) which may include a series of FPGA and processing systems, for example. In the illustrative embodiment a digital video processor (DVP) circuit card takes in the video from the sensor and divides it up into multiple 720p images. The method 200 also includes directing the lossless segments in parallel onto a number of image data output paths at block 206. This is also performed by a series of FPGA and processing systems in the UHD segmentation circuitry (e.g., 102, FIG. 1.). The method also includes generating metadata including encoded information that facilitates reconstruction of the raw UHD data from the lossless segments at block 208 and directing the metadata onto one or more metadata output paths in parallel with the image data output paths at block 210.

In an illustrative embodiment, an SMPTE Video Processor (SVP) circuit card takes in the 720p images from the DVP, divides them into appropriately formatted SMPTE 1080p video frames, and adds appropriately formatted SMPTE metadata to ancillary video space. The metadata includes packing details, such as pixel location of start of frame and end of frame, frame rate, bit depth, bit packing mode, etc. The same metadata space has provisions for giving line of sight, or pointing information indicating where the sensor was pointed for each applicable frame so that this information can be used to add context to the UHD video frame captured by the sensor.

Figure 3:
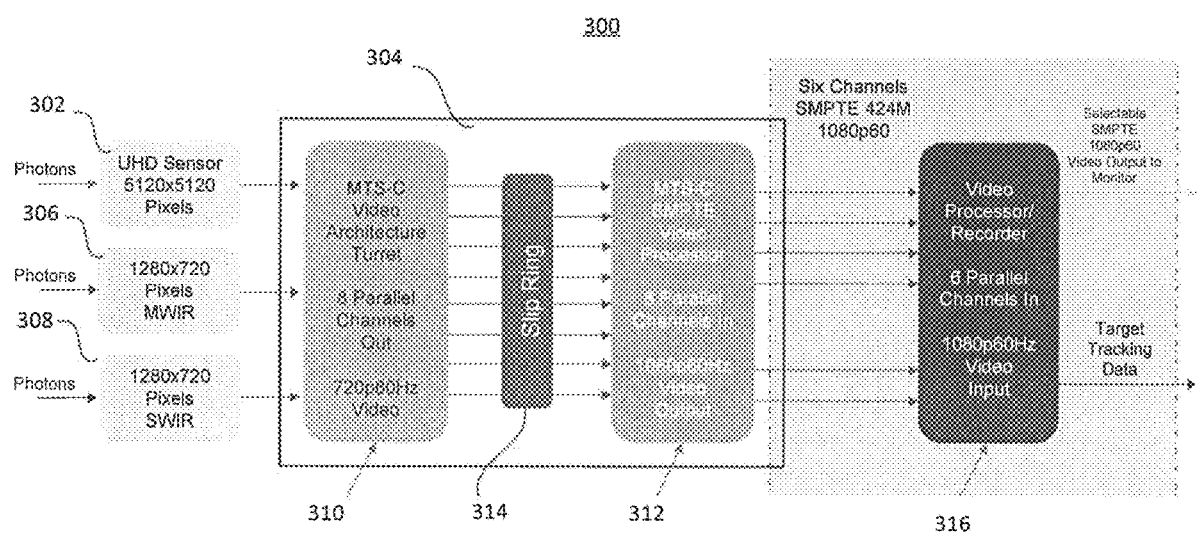
FIG. 3 is a diagram of an illustrative embodiment of a UHD sensor data processing system.

Another illustrative embodiment of an image data processing system according to an aspect of the present disclosure is described with reference to FIG. 3. In the illustrative embodiment, the system 300 includes a UHD image sensor 302 coupled to UHD segmentation circuitry 304. UHD image sensor 302 is an exemplary implementation of the UHD image sensor 104 shown in FIG. 1. UHD segmentation circuitry 310 is an exemplary implementation of the UHD segmentation circuitry 102 shown in FIG. 1.

The UHD image sensor 302 generates image frames having a 5 k×5 k pixel format. In this illustrative embodiment, two 720p compatible HD cameras 306, 308 are also coupled to the UHD segmentation circuitry 304. A first one of the 720p compatible cameras is a medium wave infrared camera 306 that generates image frames having a 1280×720 format. A second one of the 720 compatible cameras is a short wave infrared camera 308 that generates image frames having a 1280×720 format.

In the illustrative embodiment, the system is configured to transfer data in compliance with SMPTE standards such as the SMPTE424M standard, for example.

According to aspects of the present disclosure one or more UHD sensors 302 may be coupled to the UHD segmentation circuitry 304 and may provide UHD video data to the UHD segmentation circuitry 304 in a number of different UHD frame formats. In addition, one or more 720p compatible image sensors (not shown) may be coupled to the UHD segmentation circuitry 304 and may provide video data to the UHD segmentation circuitry 304 in various 720p frame formats.

In the illustrative embodiment, the UHD segmentation circuitry 304 includes a video architecture turret 310 coupled to the UHD image sensor 302 and to the 720p compatible HD cameras 306, 308 via a high speed camera interface. The UHD segmentation circuitry 304 also includes a SMPTE video processor 312 coupled to the video architecture turret 310 via a parallel pass through interface such as a slip ring interface 314.

The video architecture turret 310 packs and spreads the UHD image data from the UHD image sensor 302 across six of eight standard 720p parallel output channels as 720p60 Hz video, for example. The video architecture turret 310 also transfers the standard 720p image data from each of the 720p compatible cameras 306, 308 on the respective remaining two of the eight standard 720p parallel output channels as 720p60 Hz video.

The SMPTE video processor 312 receives the eight parallel input channels from the video architecture turret 310 and inserts KLV (Key-Length-Value) metadata using VANC with packing and spreading information to facilitate unpacking and reconstruction of the UHD image data. Persons skilled in the art should recognize that VANC (vertical ancillary) is a conventional technique for embedding non-video information in a video signal. For example, the metadata includes packing details, such as pixel location (row, column) of start of frame and end of frame, frame rate (30, 60), bit depth (8, 10, 12, 16), and bit packing mode (two bytes per pixel, one byte per pixel, etc.), for example. The same metadata space has provisions for giving line of sight (inertial measurement unit (IMU), gyro, accelerometers, resolvers, servo state, encoder feedback, focus information, temperatures of the system optics, etc.) and/or pointing information indicating where the sensor was pointed for each applicable frame. The information in the metadata can be used to add context to the UHD video frame captured by the sensor. The SMPTE video processor 312 also inserts a unique identifier for each image frame.

In the illustrative embodiment, back-end processor circuitry 316 is coupled to the UHD segmentation circuitry 304 to receive the spread and packed UHD image data along with the metadata from the SMPTE video processor 312. The back end processing circuitry 316 is an exemplary implementation of the video processing circuitry 108 shown in FIG. 1 and includes a number of outputs. For example, outputs of the back end processing circuitry could be compressed/processed video to display on a standard video display, or could be track data showing tracks of moving objects, etc. The back-end processor circuitry 316 reads the KLV metadata and performs lossless reconstruction of the UHD image data from the UHD image sensor 302 to generate and buffer full frames of UHD video. The back-end processor circuitry 316 may also be configured to identify targets and create tracking information from the buffered UHD video, for example.

Figure 4:
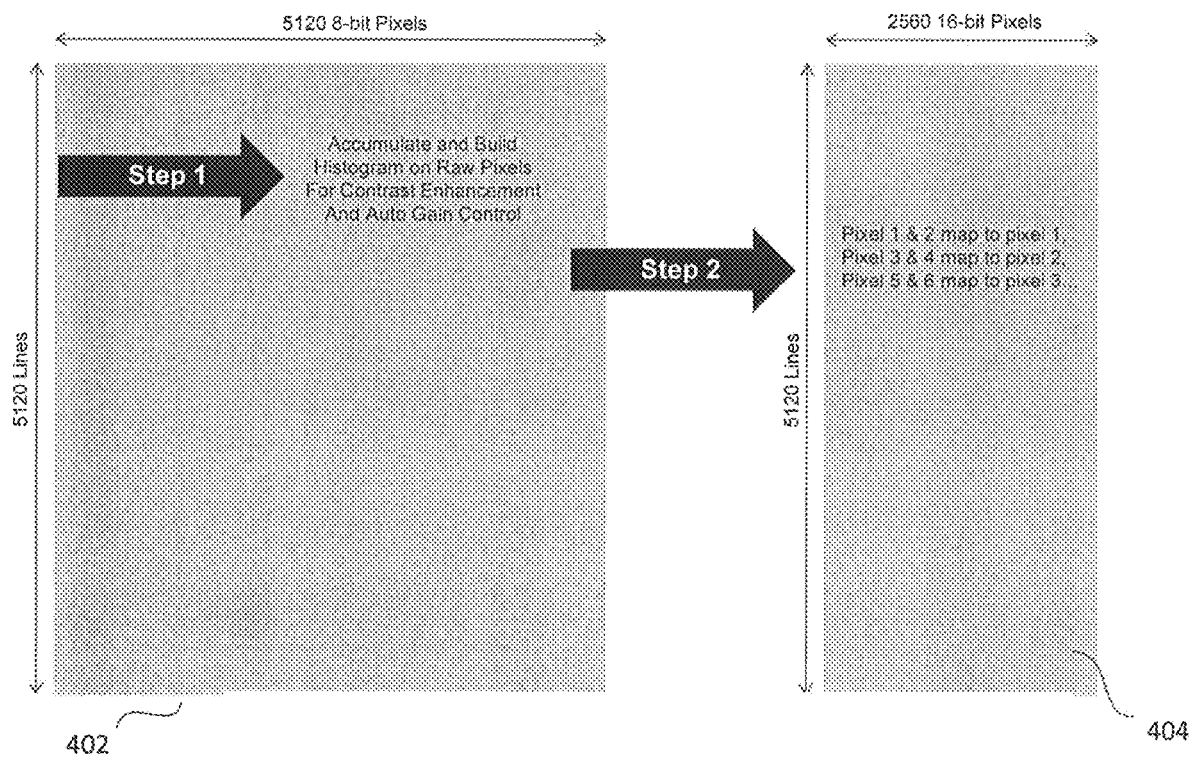
FIG. 4 is a diagram of a UHD image frame in 8 bit pixel format being packed into an image frame having 16 bit pixel format according to an aspect of the present disclosure.

Referring to FIG. 4, in an illustrative embodiment a UHD image frame in a 5120×5120 8 bit pixel format 402 is packed by mapping into 5120×2560 16 bit pixel frames 404 by packing pairs of 8 bit pixels into single 16 bit pixels. This may be performed, for example, by the video architecture turret 310 of FIG. 3 to reduce the bandwidth required across the slip ring, by utilizing the existing 16 bit pixel video architecture. This effectively cuts the bandwidth need by half. Alternatively, this packing may be performed by the video processor 312. However, packaging the pixels by the video architecture turret 310 prior to the slip ring 314 helps to mitigate data bottlenecks that may occur at the slip ring prior to the video processor 312.

Figure 5:
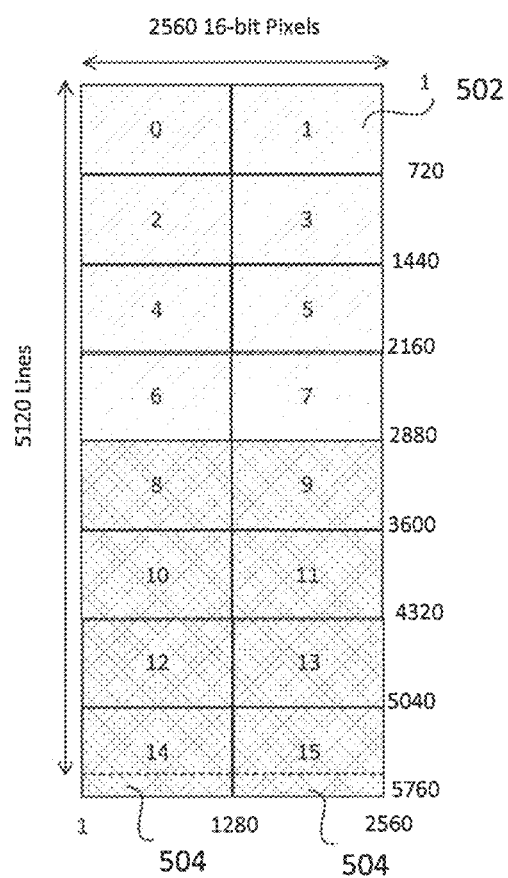
FIG. 5 is a diagram of a UHD image data segmented into 1280×720 pixel frames according to an aspect of the present disclosure.

Referring to FIG. 5, in the illustrative embodiment, each 25 mega-pixels of image data contained in the 5120×5120 image frames are converted for compatibility with a 720 video architecture by breaking up the 5 k×5 k 8 bits per image into sixteen 1280×720 frames with 16 bits per pixel. This results in sixteen 1280×720 frames 502 with 16 bit pixels. According to an aspect of the present disclosure, frames 0-7 are transported across the slip ring (314, FIG. 3) in parallel on a first 60 Hz clock cycle, and frames 8-15 are transported across the slip ring (314, FIG. 3) in parallel on the second 60 Hz clock cycle. Each eight frames of the 1280×720 60 Hz frames 502 are stored in a SMPTE video processor frame memory which is included in the video processor (312, FIG. 3) In this illustrative embodiment the SMPTE video processor frame memory has excess memory space 504 can be used for additional data transfer as applicable, every 30 Hz cycle, for example. The KLV metadata is then updated with applicable packing and spreading information such as pixel location (row, column) of start of frame and end of frame, frame rate (30, 60), bit depth (8, 10, 12, 16), and bit packing mode (two bytes per pixel, one byte per pixel, etc.), for example. Unique frame identification (ID), precision timestamp (seconds, fractional seconds all correlated to UTC time) reception of photons on the image sensor, etc. The same metadata space has provisions for giving line of sight (IMU, gyro, accelerometers, resolvers, servo state, encoder feedback, focus information, temperatures of the system optics, etc.); pointing information of where in the world the sensor was pointed for each applicable frame; so that this information can be used to add context to the UHD video frame captured by the sensor. The metadata also includes a unique identifier for each frame to generate and output four channels of 1920×1080 60 Hz frames with 20 bit per pixel in SMPTE242M video including the KLV metadata.

The amount of memory space 504 can be observed by considering that the eight parallel 720p channels of 1280× 720 frames use about 7.37 million pixels. Because the 720p frames are running at 60 frames per second or 16.667 milliseconds per frame, which is twice as fast as the UHD sensor, the 7.37 million pixels are doubled resulting in about 14.75 million pixels. The 5120×5120 pixel UHD sensor (303, FIG. 3) runs at 30 frames per second or 33.333 milliseconds per frame. Because two 8-bit pixels are packed into each 720p 16-bit pixel, each frame is reduced to an effective 2560×5120 pixel size. This results in about 13.1 million pixels per UHD frame. For every 30 Hz UHD frame (33.333 ms) there are 16 720p frames available to pack UHD sensor data. Therefore, about 14.75 million pixels are available in which to pack about 13.1 million UHD pixels every 33.33 ms or at a 30 Hz rate. In this illustrative embodiment, the excess memory space 504 available in every 30 Hz UHD frame is the difference between 14.75 million and 13.1 million which equals about 1.65 million pixels.

While aspects of the present disclosure have been particularly shown and described with reference to the exemplary embodiments thereof, it will be understood by those of ordinary skill in the art that various changes in form and detail may be made therein without departing from the scope of the present disclosure as defined by the following claims.

The invention claimed is:

1. A sensor data processing apparatus, comprising processing circuitry;
   a plurality of video data input paths coupled to the processing circuitry, wherein the plurality of video data input paths includes one or more raw ultra-high definition (UHD) data input paths and one or more 720p compatible video data input paths;
   a plurality of parallel 720p compatible video data output paths coupled to the processing circuitry; and
   a video architecture turret configured to receive a plurality of streams on the one or more raw UHD data input paths and spread the raw UHD data streams across the parallel 720p compatible video data output paths in a 720p60 video format;
   wherein the processing circuitry is configured to:
   receive the video data from a plurality of sensors including receiving the raw UHD data from a UHD sensor and non-UHD video data from a non-UHD 720p compatible image sensor, wherein the raw UHD data is received in a 5120 line by 5120 8 bit pixel per line fame format;
   divide the video data including the raw UHD data and the non-UHD video data into segments, wherein the raw UHD data is packed into frames having a 5120 line by 2560 16 bit per line frame format;
   mapping each of the frames having a 5120 line by 2560 16 bit pixel per line format into sixteen frames having a 720 line by 1280 16 bit pixel per line format, wherein the mapping leaves an excess memory space of 640 lines by 1280 16 bit pixels in the sixteen frames;
   direct the segments onto the parallel 720p compatible video data output paths; and
   generate metadata including encoded information that describes how the segments were generated from the video data and facilitates reconstruction of the video data including the raw UHD data and the non-UHD video data from the segments.

2. The apparatus of claim 1, further comprising a UHD image sensor coupled to the raw UHD data input path.

3. The apparatus of claim 2, further comprising video processing circuitry coupled to the image data output paths.

4. The apparatus of claim 3, wherein the video processing circuitry is configured to unpack and buffer the raw UHD data received on the image data output paths.

5. The apparatus of claim 1, further comprising a video processor configured to:
   receive the raw UHD data from the video architecture turret and spread the raw UHD data on the eight parallel 720p compatible video data output paths in the 720p60 video format;
   generate the metadata; and
   output the metadata along with the spread raw UHD data in the excess memory space.

6. The apparatus of claim 1, comprising one or more metadata output paths coupled to the processing circuitry separate from the image data output paths.

7. The apparatus of claim 6, wherein the one or more metadata output paths are coupled to the processing circuitry in parallel with the image data output paths.

8. A sensor data processing method comprising:
   receiving ultra high definition image data frames from an ultra-high definition sensor in a 5120 line by 5120 8 bit pixel per line frame format;
   storing the ultra-high definition image data frames into frames having a 5120 line by 2560 16 bit pixel per line format;
   mapping each of the frames having a 5120 line by 2560 16 bit pixel per line format into sixteen frames having a 720 line×1280 16 bit pixel per line format, wherein the mapping leaves an excess memory space of 640 lines by 1280 16 bit pixels in the sixteen frames;
   transporting the sixteen frames across a standard 720p 60 Hz video architecture.

9. The method of claim 8, comprising:
   transporting a first eight of the sixteen frames in parallel on first clock cycle of the 720p 60 Hz video architecture; and
   transporting a second eight of the sixteen frames in parallel on a second clock cycle of the 720p 60 Hz video architecture.

10. The method of claim 9, wherein:
    the first eight of the sixteen frames includes a first portion of the excess memory space; and
    the second eight of the sixteen frames includes a second portion of the excess memory space.

11. The method of claim 8, comprising:
    transporting the first eight frames in parallel across a slip ring interface from a video turret; and
    transporting the second eight frames in parallel across the slip ring from the video turret.

12. The method of claim 8, comprising:
    storing each eight frames in an SMPTE video processor frame memory after transporting the eight frames in parallel across the slip ring interface.

13. The method of claim 8, wherein the excess memory space is between two of the sixteen frames.

14. The method of claim 8, comprising: storing metadata in the excess memory space.

15. The method of claim 14, wherein the metadata includes KLV metadata defining the packing and formatting of the video data.

16. The method of claim 14, wherein the metadata includes line of sight information of the sensor, servo state information, encoder feedback, focus information, and/or optical component temperature.

17. The method of claim 14, wherein the metadata includes information from an inertial measurement units (IMU), gyro, accelerometer and/or resolver.

18. The method of claim 14, wherein the metadata includes pointing information for each corresponding frames.

19. A sensor data processing method comprising:
receiving a first number of ultra high definition image data frames from an ultra-high definition sensor an 8 bit pixel per line frame format;
storing the ultra-high definition image data frames into a second number of frames having a 16 bit pixel per line format, wherein the second number is half the first number;
mapping each of the second number of frames having a 16 bit pixel format into a plurality of frames having a 720 line×1280 16 bit pixel per line format, wherein the mapping leaves an excess memory space in the plurality of frames; and
transporting the plurality of frames across a standard 720p 60 Hz video architecture.

* * * * *